(12) United States Patent
Catalan

(10) Patent No.: US 9,558,876 B2
(45) Date of Patent: *Jan. 31, 2017

(54) HALBACH ARRAY OF ELECTROMAGNETS WITH SUBSTANTIALLY CONTIGUOUS VERTICAL AND HORIZONTAL CORES

(71) Applicant: Roberto Sanchez Catalan, Lorton, VA (US)

(72) Inventor: Roberto Sanchez Catalan, Lorton, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/096,201

(22) Filed: Apr. 11, 2016

(65) Prior Publication Data

US 2016/0225507 A1  Aug. 4, 2016

Related U.S. Application Data

(63) Continuation of application No. 13/941,833, filed on Jul. 15, 2013, now abandoned.

(51) Int. Cl.
| | |
|---|---|
| H01F 7/06 | (2006.01) |
| H01F 7/20 | (2006.01) |
| H01F 3/10 | (2006.01) |
| B60L 3/12 | (2006.01) |
| B60L 7/14 | (2006.01) |
| B60L 11/18 | (2006.01) |
| H01F 41/02 | (2006.01) |

(52) U.S. Cl.
CPC . *H01F 7/20* (2013.01); *B60L 3/12* (2013.01); *B60L 7/14* (2013.01); *B60L 11/1803* (2013.01); *B60L 11/1816* (2013.01); *B60L 11/1864* (2013.01); *B60L 11/1868* (2013.01); *H01F 3/10* (2013.01); *H01F 41/02* (2013.01); *B60L 2210/30* (2013.01); *B60L 2220/50* (2013.01); *B60L 2240/549* (2013.01); *B60L 2250/16* (2013.01); *B60L 2250/26* (2013.01); *Y10T 29/49075* (2015.01)

(58) Field of Classification Search
CPC ........ H01F 5/00; H01F 7/0273; H01F 7/0278; H01F 7/06
See application file for complete search history.

(56) References Cited

U.S. PATENT DOCUMENTS

| | | | |
|---|---|---|---|
| 5,705,902 | A | 1/1998 | Merritt et al. |
| 6,841,910 | B2 | 1/2005 | Gery |
| 6,858,962 | B2 | 2/2005 | Post |
| 6,906,446 | B2 | 6/2005 | Post |
| 7,352,096 | B2 | 4/2008 | Dunn et al. |
| 7,540,004 | B2 | 5/2009 | Lee et al. |
| 7,541,813 | B2 | 6/2009 | Synder, Jr. et al. |
| 7,598,646 | B2 | 10/2009 | Cleveland |
| 8,009,001 | B1 | 8/2011 | Cleveland |
| 8,183,731 | B2 | 5/2012 | Epstein et al. |
| 8,264,314 | B2 | 9/2012 | Sankar |
| 2013/0207488 | A1 | 8/2013 | Labbe |

*Primary Examiner* — Bernard Rojas
(74) *Attorney, Agent, or Firm* — Peter Kramer

(57) ABSTRACT

Electromagnetic Halbach array device with substantially contiguous vertical and horizontal cores. The device is equipped with horizontal cores having protrusions which establish substantial contiguity between horizontal and vertical cores.

6 Claims, 5 Drawing Sheets

Figure 1:
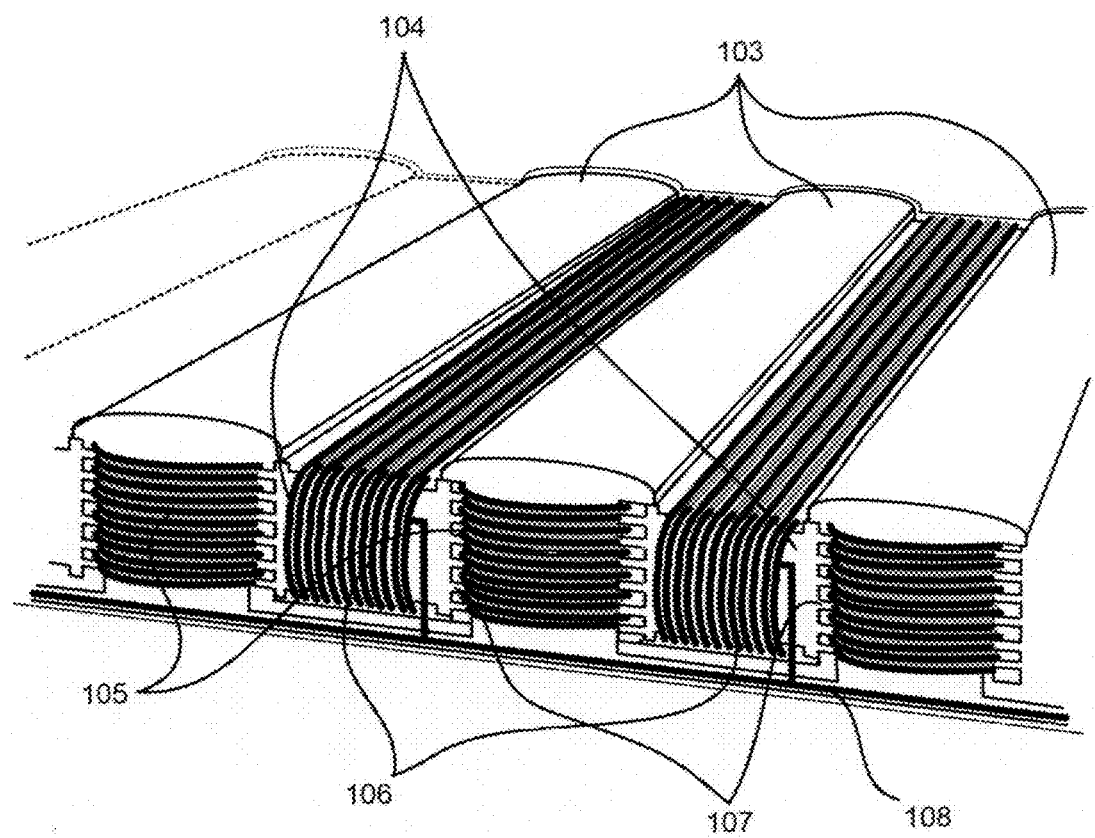

HALBACH ARRAY OF ELECTROMAGNETS WITH SUBSTANTIALLY CONTIGUOUS VERTICAL AND HORIZONTAL CORES

CROSS-REFERENCE TO RELATED APPLICATIONS

This application is a Continuation of Nonprovisional application Ser. No. 13/941,833 filed Jul. 15, 2013. The contents of U.S. Ser. No. 13/941,833 are expressly incorporated herein by reference.

BACKGROUND OF THE INVENTION

Field of the Invention

The embodiments of the invention relate to Halbach arrays, which, by their nature, exhibit a Halbach array effect. Halbach arrays are useful in electric devices such as motors and generators, and have other useful applications.

Description of Related Art Including Information Disclosed Under 37 CFR 1.97 and 1.98

Halbach arrays have been typically comprised of permanent magnets wherein the magnets are arranged in a manner such that the magnetic field on one side of the array is augmented or enhanced while the magnetic field on the opposite side of the array is elastically decreased or cancelled. Some references have described arrangements of ordinary electromagnets arranged in Halbach array sequence but the level of augmentation and reduction of magnetic fields achieved has been severely disabled or non-existent and therefore yielding no real advantage.

U.S. Pat. No. 5,705,902 discloses cylindrical electromagnets configured to approximate a Halbach array. Similarly, U.S. Pat. No. 5,705,902 discloses Halbach arrays within a generator. The prior art, as noted above, includes applications in which permanent magnets have been arranged in Halbach arrays sequence. Some examples include U.S. Pat. Nos. 7,540,004, 7,031,116, 6,906,446, 6,841,910 and 6,858,962. None of the examples in the prior art describe Halbach array sequences of electromagnets which produce an effective and significant enhanced magnetic field on one side of the array and proportional reduction of magnetic field on the opposite side.

BRIEF SUMMARY OF THE INVENTION

The inventive subject matter disclosed herein describes a novel Halbach array of electromagnets having substantially contiguous vertical and horizontal cores. A fountain analogy can help illustrate the Halbach array effect in simple terms. The Halbach array effect can be likened to fountains of magnetic force wherein elastic looping streams of magnetic force emanate from the poles like streams of water from fountains. Where sets of three adjacent similar poles occur on one side of the array, the similar poles cooperatively magnify the fountains of magnetic force on one side of the array while elastically decreasing or cancelling the fountains on the opposite side of the array, which only has alternating north and south poles.

When ordinary electromagnets are merely oriented in Halbach array sequence, the magnetic windings around the vertical electromagnetic cores negate the Halbach effect by acting as a dual barrier. The necessary interactions between adjacent electromagnetic cores are substantially impaired by lack of physical contiguity between the cores because the windings around the vertical cores act as both a physical barrier and an energized barrier.

The prior art lacks any indication that persons of ordinary skill in the art were aware of the nature of the materials, structures, and energies involved in 'artificially' generating a Halbach effect, energies of which are elastic and extant only as an array. Thus we see in prior art localized and isolated forces. The problems involved in enabling the Halbach effect in arrays of electromagnets could be solved by providing substantial contiguity in the electromagnetic cores to form flux apertures that blend the generated forces into an integrated whole. The present invention solves the problem of inadequate interaction between adjacent horizontal and vertical electromagnetic cores in Halbach array sequence by configuring the horizontal electromagnetic cores with magnetic flux conduits, which can be in the form of fork-like protrusions from the horizontal cores which physically contact adjacent vertical cores. These protrusions provide substantial physical contiguity between the adjacent cores which is required to enable the Halbach effect using arrays of electromagnets with levels of enhancement and reduction of magnetic fields heretofore unrealized.

BRIEF DESCRIPTION OF THE SEVERAL VIEWS OF THE DRAWING(S)

Figure 2:
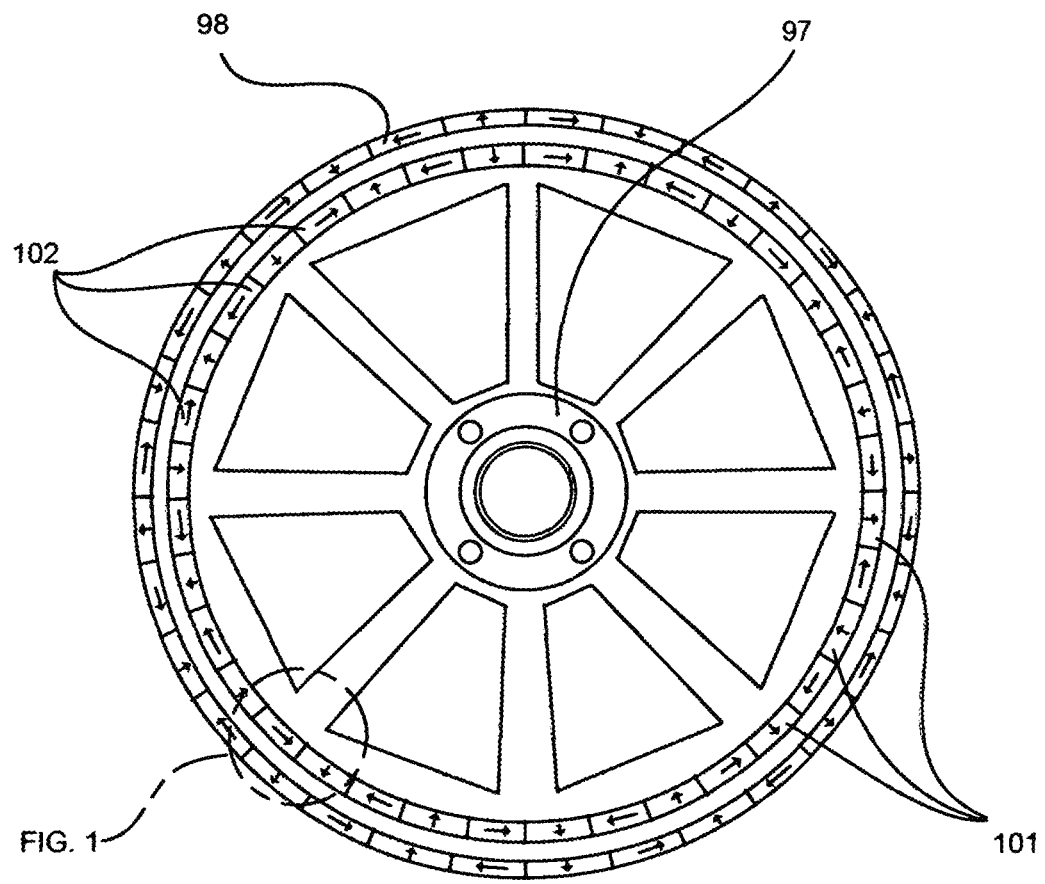
Figure 3:
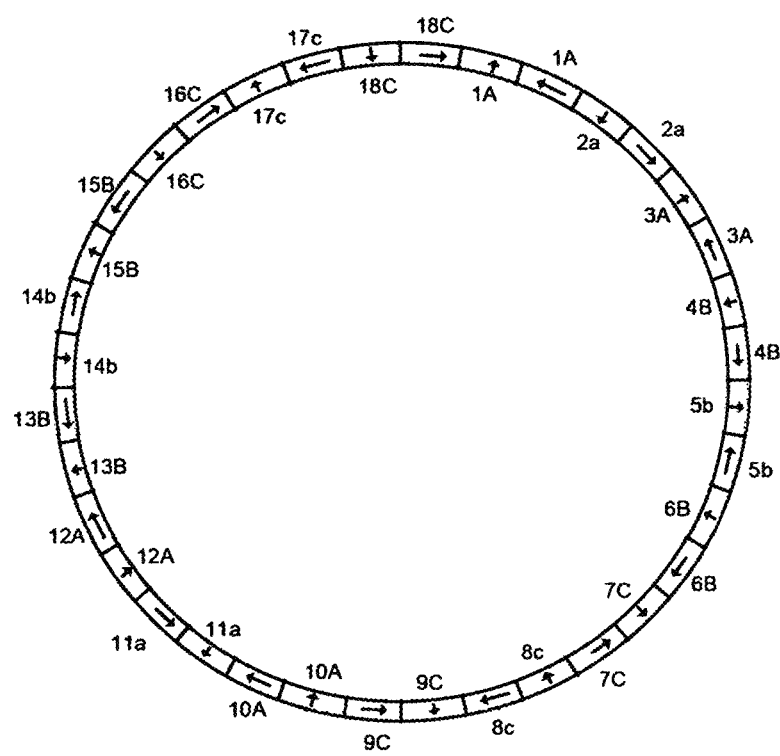
Figure 4:
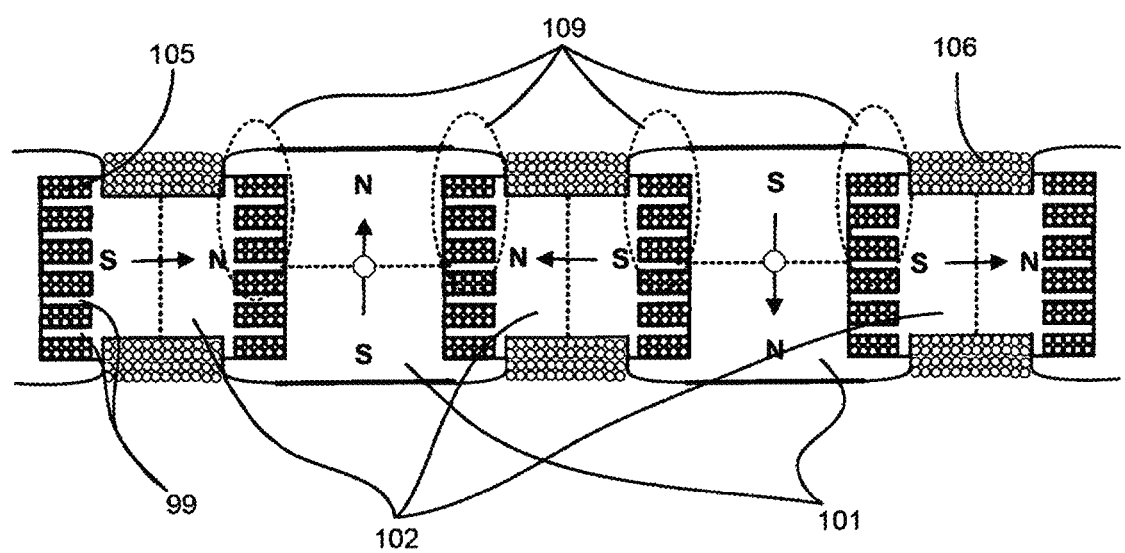
Figure 5:
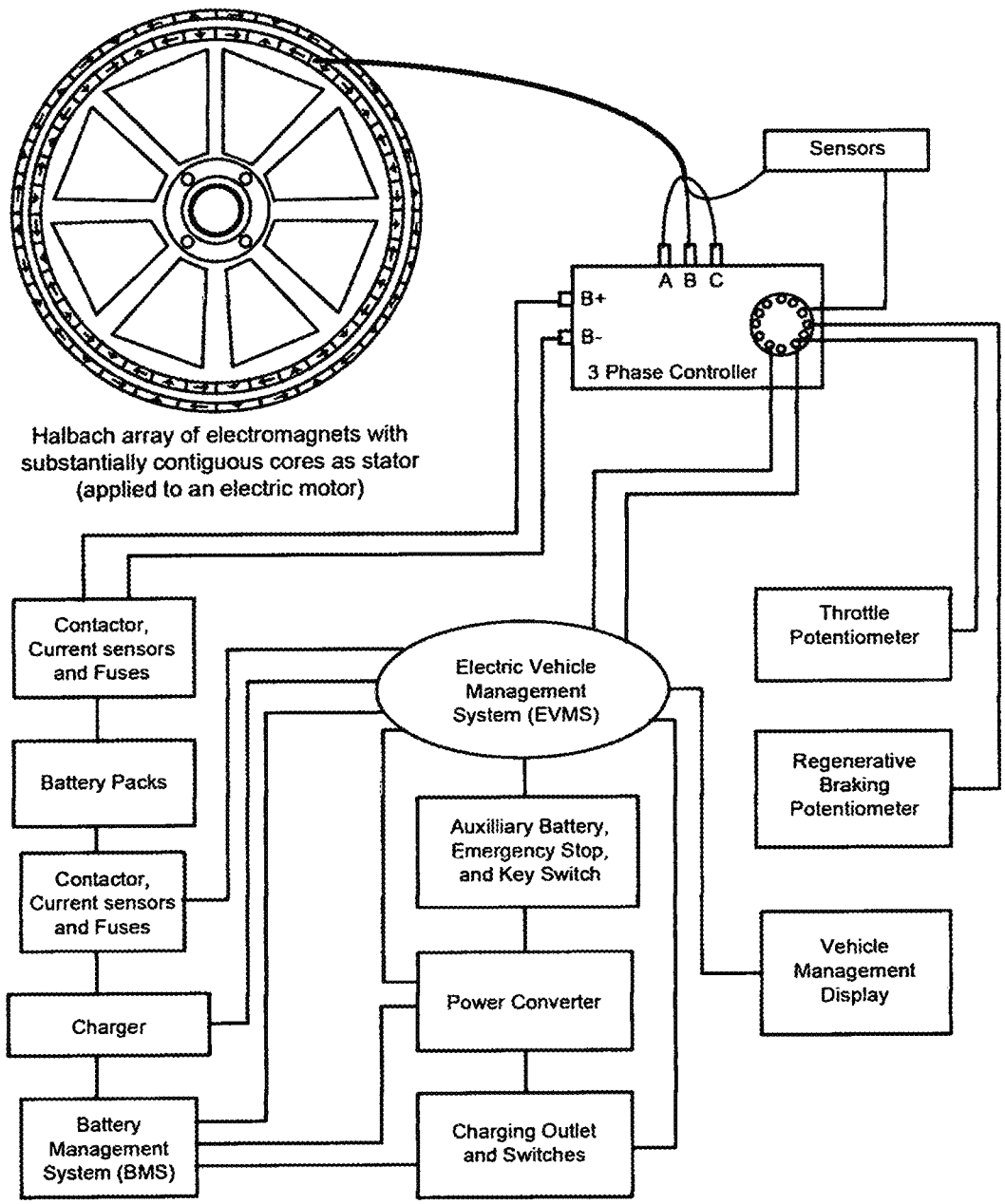

FIG. 1 Close-up view of a Halbach array of electromagnets with substantially contiguous cores FIG. 2 Sequence and orientation of vertical and horizontal electromagnets in a stator mounted to a central hub FIG. 3 A sample wiring layout for an inner Halbach array of electromagnets FIG. 4 Cut-away close-up view of a dual-sided Halbach array of electromagnets showing fork-like prongs FIG. 5 An Halbach array of electromagnets with contiguous cores as a part in a diagram of interconnected electric vehicle components

DETAILED DESCRIPTION OF THE INVENTION

An embodiment of the present invention in FIG. 1 shows up close, components and arrangement of electromagnets, specifically horizontal electromagnet cores 104 with its matching horizontal magnetic coils 106, which are alternately integrated between a plurality of vertical electromagnet cores 103 with matching vertical magnetic coils 105. These electromagnets are then arranged in a Halbach array sequence as shown in a broader view in FIG. 2 which depicts the orientation of each vertical electromagnet 101 and horizontal electromagnet 102 in the array to form a stator.

The horizontal cores are configured with fork-like prongs 107 in FIG. 1, which physically contact the cores of each adjacent vertical electromagnet and act as magnetic flux conduits. The magnetic coils of the vertical electromagnet cores are configured with gaps 99 (more clearly shown in FIG. 4) to accommodate introduction of the fork-like prongs of the horizontal electromagnet thereby achieving substantial contiguity between the vertical and horizontal cores. This enables the magnetic flux from the horizontal electromagnets to be delivered directly to the vertical electromagnet core, bypassing the physical and active barrier presented by the vertical electromagnet's magnetic coils. This also enables the formation of flux apertures 109 (shown in FIG. 4) which are the sets of three adjacent similar poles of the enhanced side, and the alternating poles on the opposite side, which is directly analogous to the polar arrangement in permanent magnet Halbach arrays.

It should be noted that what is meant by "substantial contiguity" is achieved by providing physical contact or very close proximity, unobstructed by magnetic coils or windings, between adjacent electromagnet cores using magnetic flux conduits which enable magnetic flux between cores such that a Halbach effect is achieved with magnetic field enhancement and cancellation with magnitudes up to those approximating that which would occur with contiguous permanent magnets in Halbach arrays. Substantial contiguity between adjacent horizontal and vertical electromagnetic cores thereby provides greater levels of enhancement for Halbach arrays of electromagnets than known in the prior art including levels comparable to levels that have been achieved with permanent magnets in Halbach arrays. The magnetic flux conduits may be configured as fork-like prongs, protrusions, or other suitable configurations. It should be further noted that the terms contiguity, enhancement, and cancellation are used per the meaning would be understood by a person of ordinary skill in the art at the time of the invention.

Because the film of insulation covering magnetic coil surrounding vertical electromagnets may incur damage during winding, the use of insulating slot paper such as that made from Nomex™ and Mylar™ is recommended. The magnetic coils surrounding the horizontal electromagnets generally do not interfere with assembly, therefore the magnetic coils for the horizontal electromagnets can be wound prior to or after insertion.

A convenient method for manufacturing and assembly could employ modular core segments to facilitate automated winding; the segments being pre-configured to embed insulation and gaps in the coils of the vertical electromagnets. These can be mated to similarly modularized pre-wound horizontal cores that are equipped with fork-like prongs at each end.

The stator in FIG. 2 with vertical electromagnets and horizontal electromagnets arranged in Halbach array sequence can be mounted on a central hub 97, with an outer set of permanent magnets 98 which are also arranged in Halbach array sequence. The permanent magnets, for example, can be affixed to an automobile's alloy wheel as a rotor to form an electric motor. For this example, a wiring layout for the inner Halbach array electromagnets is provided in FIG. 3 showing three separate wiring phases, A, B, and C. The same pattern can be used for both horizontal and vertical electromagnets as separate sets. Winding is clockwise if the letter is capitalized, and counter clockwise if the letter is in lower case in the diagram. Once this sample electric motor with its alloy rotor wheel is completed, tested and properly mounted, the two pairs of vertical and horizontal stator cores can be physically hardwired and simultaneously commutated by connecting each of the three-phase wires 108 (shown up close in FIG. 1) to the appropriate contact points on commercially available single three-phase electric motor controller as shown in a sample diagram of interconnected electric vehicle components in FIG. 5. Alternatively, the vertical and horizontal cores can be wired separately but still be electronically interlocked and commutated simultaneously by connecting each phase wire of each core to the appropriate contact points on a dual three-phase electric motor controller, which would be perfect for the dual-sided configuration in FIG. 4.

This novel Halbach array of electromagnets with substantially contiguous vertical and horizontal cores can be implemented as axial, linear, or other configurations for a multitude of applications, such as stators or rotors for electric motors.

CONCLUSIONS, RAMIFICATIONS, AND SCOPE

Generally the primary goal of any Halbach array implementation is to maximize efficiency by harnessing the magnified and directed electromagnetic forces produced. Electromagnets having magnetically permeable cores are a thousand times more powerful than electromagnets that do not have a core (i.e. composed only of magnetic coil) due to the magnetic resistance of air. Moreover, in ordinary vertical and horizontal electromagnets merely oriented as a Halbach array, the magnetic coils around each vertical core would prevent direct physical connection to horizontal core. More critically, the path of the magnetic flux driven through the horizontal cores is dispersed because the flow of the magnetic energy in the powered coils surrounding the vertical cores travels in a perpendicular direction to that of the horizontal electromagnet, and the material used in the coil is not magnetically permeable as the core.

Without substantial contiguity between electromagnetic cores, ordinary electromagnets merely oriented as a Halbach array would exhibit a severely disabled or even negated Halbach effect.

The Halbach array electromagnet with substantially contiguous cores of the present invention provides a quantum leap in advancing the technology of Halbach arrays employing electromagnets. It is likely the simplest and closest functional equivalent of permanent magnet Halbach arrays as applied to electromagnets.

It should be understood that many different configurations of Halbach array electromagnets can be fabricated for a multitude of different applications. It is impossible to describe the details including configuration of wiring and controls for every application. The examples provided in this disclosure provide a glimpse of the manifold uses and applications of the present inventive subject matter.

I claim:

1. A Halbach array of electromagnets comprising,
a plurality of horizontal electromagnets and a plurality of horizontal electromagnetic cores, said horizontal electromagnets further comprised of said horizontal electromagnetic cores and magnetic windings,
a plurality of vertical electromagnets and a plurality of vertical electromagnetic cores, said vertical electromagnets further comprised of said vertical electromagnetic cores and magnetic windings,
said plurality of horizontal electromagnets and said plurality of vertical electromagnets arranged in Halbach array sequence, with said Halbach array sequence further comprised wherein said vertical electromagnets and said horizontal electromagnets are positioned adjacent to each other and said vertical electromagnets and said horizontal electromagnets are further arranged in an alternating sequence,
magnetic flux conduits, said magnetic flux conduits having fork-like prongs with said fork-like prongs protruding from said horizontal electromagnetic cores,
said magnetic flux conduits with said fork-like prongs configured to provide substantial contiguity with adjacent vertical electromagnetic cores, either wherein said fork-like prongs physically contact adjacent vertical electromagnetic cores or wherein said fork-like prongs are positioned in close proximity to said adjacent vertical electromagnetic cores.

2. The Halbach array of electromagnets of claim 1 further comprising wherein said magnetic windings around said vertical electromagnetic cores have gaps, said gaps arranged to permit penetration of said magnetic flux conduits through said magnetic windings around said vertical electromagnetic cores thereby permitting physical contact between said magnetic flux conduits and said vertical electromagnetic cores and permitting substantial contiguity between said horizontal magnetic cores and said vertical magnetic cores.

3. In a Halbach array of electromagnets having adjacent horizontal and vertical electromagnetic cores, magnetic flux conduits for effecting substantial physical contiguity wherein, said magnetic flux conduits are configured to enable physical contact between the adjacent horizontal and vertical electromagnetic cores thereby establishing substantial physical contiguity between the adjacent horizontal and vertical electromagnetic cores.

4. The magnetic flux conduits of claim 3, wherein said magnetic flux conduits are further comprised of fork-like prongs.

5. A Halbach array of electromagnets comprising, a plurality of horizontal electromagnets and a plurality of horizontal electromagnetic cores, said horizontal electromagnets further comprised of said horizontal electromagnetic cores and magnetic windings, a plurality of vertical electromagnets and a plurality of vertical electromagnetic cores, said vertical electromagnets further comprised of said vertical electromagnetic cores and magnetic windings, means to provide substantial contiguity between said horizontal electromagnetic cores and said vertical electromagnetic cores.

6. A method for creating an array of electromagnets, comprising, fabricating a first plurality of electromagnets and a first plurality of electromagnetic cores, said first plurality of electromagnets being comprised of said first plurality of electromagnetic cores and magnetic coils, with the electromagnets of said first plurality of electromagnets having magnetic flux conduits, said magnetic flux conduits having fork-like prongs with said fork-like prongs protruding from each of the electromagnetic cores of said first plurality of electromagnetic cores, fabricating a second plurality of electromagnets and a second plurality of electromagnetic cores, said second plurality of electromagnets being comprised of said second plurality of electromagnetic cores and magnetic coils, with each of the electromagnets of said second plurality of electromagnets having gaps in said magnetic coils configured to accommodate passage of said magnetic flux conduits through said magnetic coils, assembling of said first plurality of electromagnets and said second plurality of electromagnets in a Halbach array sequence, with the electromagnets of said first plurality of electromagnets magnetically oriented horizontally and with the electromagnets of said second array of electromagnets magnetically oriented vertically, and with the respective horizontally and vertically oriented electromagnets positioned in alternating adjacent sequence, and with said magnetic flux conduits in proximity to the cores of said second array of electromagnetic cores wherein substantial contiguity is established between the adjacent vertically and horizontally oriented electromagnetic cores when said first plurality of electromagnets and said second plurality of electromagnets are energized.

* * * * *